Reissued Mar. 1, 1927. Re. 16,562

UNITED STATES PATENT OFFICE.

ROBERT K. COONEY, OF TOLEDO, OHIO, ASSIGNOR, BY DIRECT AND MESNE ASSIGNMENTS, TO CAMPBELL-COONEY PATENTS CO., OF HOMER, MICHIGAN, A CORPORATION OF MICHIGAN.

BUTTER AND CREAM TREATING PROCESS.

No Drawing. Original No. 1.599,649, dated September 14, 1926, Serial No. 758,876, filed December 30, 1924. Renewed February 24, 1926. Application for reissue filed October 11, 1926. Serial No. 140,765.

This invention relates to an improvement in butter and cream treating process.

It is the common practice of creameries to purchase or receive cream from various producers by whom the cream is handled under varying conditions and it arrives at the creamery in various conditions. It is not possible to handle the various batches separately in the creamery processes and the product of numerous producers must be mixed in the making of butter, for delivery, or for other uses. This results in a product which is not uniform, either in the cream or butter.

The objects of my improved process are:

First, to provide an improved method of treating cream whereby a very uniform product may be produced.

Second, to provide an improved butter making process which enables the production of a very uniform product.

Objects pertaining to details of my improved process will definitely appear from the description to follow.

I accomplish the objects of my invention by the devices and means described in the following specification. The invention is clearly defined and pointed out in the claims.

The cream as delivered or collected from various producers may be mixed or placed in a common receptacle as desired. It is usually found that the cream is of varying degrees of acidity, not only as to different batches but as affected by weather.

To the cream to be treated I add, as a basic element containing reacting substance, a lime, the quantity depending upon the acidity of the cream; for example, if it is desired to change 2000 pounds of cream of .40% acidity to a .20% acidity, about eight pints of lime will produce satisfactory results. The lime is mixed with cold water and sprayed into the cream while stirring or agitating the cream. The lime may be prepared in various forms but I refer to the commercial preparation in which the lime has been previously treated so that it will readily mix with the cold water. The temperature of the cream during this step of the process should be from 90° to 110° F., the object being to maintain a temperature which will render the entire body of cream fluid and of even consistency.

This line acts as a diluent agent not only to reduce the degree of acidity, but to promote such a condition in the cream as to permit removal of the non-fat milk solids in such ratio as to give a cream product of decreased non-fat solid content. This liquid dispersed agent as disseminated by stirring is a factor in the control for a uniform product but is used preferably short of truly neutralizing the cream.

The cream is then Pasteurized. Any suitable Pasteurizing apparatus may be used for this purpose. After Pasteurizing, at least a portion of the lime and other solids foreign to the cream, are removed by means of a centrifugal machine or "clarifier," the cream being preferably passed directly to the clarifier from the Pasteurizing operation and while still hot, although the temperature while passing through the clarifier may be varied considerably with satisfactory results. The clarifier separates or produces one product carrying a high proportion of non-fat milk solids and simultaneously produces a second product as the treated cream of less non-fat solid content than the raw or untreated cream.

Cream thus treated may retain its fat in normal globular form and is suitable for use as sweet cream for table or other uses or for making ice cream.

When it is desired to produce butter I add lactic acid culture preferably by adding the pure lactic acid culture to skimmed milk, thus forming a "starter." About 200 pounds of the "starter" is employed to 2000 pounds of cream. I also preferably add two or three per cent of milk sugar.

The cream is then maintained at a temperature of between 60° and 70° F., for a period sufficient to develop the acidity to the desired point for churning, the cream being churned as soon as this point is reached.

By my improved process butter of uniform grade and flavor may be produced from cream made up of the product of numerous producers or in different stages of ripeness. The butter thus produced also has the advantage of keeping qualities and, also, the cream when used as such has the advantage of keeping for a considerable period and being of uniform quality.

Having thus described my invention what I claim as new and desire to secure by Letters Patent is:

1. The process of treating cream of high acidity consisting of adding a neutralizing agent to reduce the acidity to the desired point, Pasteurizing, and passing while heated through a centrifugal machine whereby substantially all the solids formed by the reaction of the neutralizing agent are removed.

2. The process of treating cream consisting of adding a neutralizing agent to reduce the acidity to the desired point, Pasteurizing, and subjecting to a centrifugal machine whereby substantially all the solids formed by the reaction of the neutralizing agent are removed.

3. The process of treating cream consisting of adding a neutralizing agent to reduce the acidity to the desired point, and subjecting to a centrifugal machine whereby substantially all the solids formed by the reaction of the neutralizing agent are removed.

4. The process of treating cream of high acidity consisting of adding a neutralizing agent to reduce the acidity to the desired point, Pasteurizing, and subjecting while at approximately Pasteurizing temperature to a centrifugal machine.

5. The process of treating sour cream for producing a uniform product comprising promoting separability by disseminating a reacting agent effective upon the nonfat solids of cream in decreasing the acidity of the cream, rendering the cream fluid and of even consistency including agitating and warming, and subjecting to centrifugal action whereby substantially all of the reaction products of the reacting agent are removed.

6. In the preparation of a cream for butter to have its acidity increased by the addition of a starter, the process which comprises treating sour cream with a basic reacting agent to reduce the acidity to a desired extent while still leaving the cream acid, warming the cream, and subjecting to a centrifugal machine whereby nonfat solids of the cream as attacked by said agent to form reaction products have substantially all of said reaction products removed.

In witness whereof I affix my signature.

ROBERT K. COONEY.